US009696973B1

(12) United States Patent
Spoon (10) Patent No.: US 9,696,973 B1
(45) Date of Patent: Jul. 4, 2017

(54) COMPILATION CACHE WITH IMPORTS SCANNER (71) Applicant: SEMMLE LIMITED, Oxford (GB)

(72) Inventor: Alexander Spoon, Atlanta, GA (US)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/052,258

(22) Filed: Feb. 24, 2016

(51) Int. Cl.
G06F 9/45 (2006.01)
(52) U.S. Cl.
CPC ...................... G06F 8/41 (2013.01)
(58) Field of Classification Search
None
See application file for complete search history.

(56) References Cited

U.S. PATENT DOCUMENTS

| 5,303,377 | A | | 4/1994 | Gupta et al. | |
|---|---|---|---|---|---|
| 5,649,201 | A | * | 7/1997 | Kitadate | G06F 8/427 714/38.12 |
| 5,748,961 | A | * | 5/1998 | Hanna | G06F 8/71 717/121 |
| 5,862,385 | A | | 1/1999 | Iitsuka | |
| 5,889,995 | A | * | 3/1999 | Segnan | G06F 9/443 712/E9.084 |
| 5,956,513 | A | * | 9/1999 | McLain, Jr. | G06F 8/71 717/142 |
| 5,978,585 | A | * | 11/1999 | Crelier | G06F 8/48 717/118 |
| 6,182,274 | B1 | * | 1/2001 | Lau | G06F 8/36 717/104 |
| 6,546,551 | B1 | * | 4/2003 | Sweeney | G06F 9/44521 717/148 |
| 6,564,297 | B1 | | 5/2003 | Kosche | |
| 6,836,883 | B1 | * | 12/2004 | Abrams | G06F 8/47 717/140 |
| 6,845,501 | B2 | | 1/2005 | Thompson et al. | |
| 6,901,587 | B2 | * | 5/2005 | Kramskoy | G06F 8/4442 711/118 |
| 7,051,322 | B2 | * | 5/2006 | Rioux | G06F 8/427 717/132 |

(Continued)

OTHER PUBLICATIONS

Robert Mecklenburg, Managing Projects with GNU Make, 3rd Edition, published by O'Reilly, 2004, p. 1-19.*

(Continued)

Primary Examiner — Tuan Q. Dam
Assistant Examiner — Zheng Wei
(74) Attorney, Agent, or Firm — Fish & Richardson P.C.

(57) ABSTRACT

Methods, systems, and apparatus, including computer programs encoded on computer storage media, for using an imports scanner to maintain a compilation cache. One of the methods includes receiving an original set of source code files to be compiled for a compilation target. Each file in in the original set having an entry point is added to a reduced set of source code files. Each unscanned file in the reduced set of source code files is scanned for import statements until no unscanned files in the reduced set of source code remain. Each file identified by an import statement is added to the reduced set of source code files. If the reduced set of files is not represented by an entry in a compilation cache, the compilation target is generated using only the reduced set of source code files instead of the original set of source code files.

30 Claims, 3 Drawing Sheets (56) References Cited

U.S. PATENT DOCUMENTS

| | | | | |
|---|---|---|---|---|
| 7,246,346 B2* | 7/2007 | Demsey | G06F 9/45516 | 711/103 |
| 7,472,375 B2* | 12/2008 | Ye | G06F 8/52 | 717/106 |
| 7,596,782 B2* | 9/2009 | Ebbo | G06F 8/71 | 717/114 |
| 7,735,071 B2* | 6/2010 | Abrams | G06F 8/47 | 717/137 |
| 7,882,499 B2* | 2/2011 | Post | G06F 9/45504 | 709/220 |
| 8,214,816 B2 | 7/2012 | Chen et al. | | |
| 8,307,352 B2* | 11/2012 | Mausolf | G06F 9/44505 | 717/152 |
| 8,601,455 B2* | 12/2013 | Graham | G06F 8/36 | 717/151 |
| 8,726,249 B2* | 5/2014 | Gu et al. | G06F 9/4401 | 717/148 |
| 9,009,664 B2* | 4/2015 | Muddu | G06F 8/75 | 717/121 |
| 9,110,751 B2* | 8/2015 | Fisher | G06F 8/41 | |
| 2002/0108106 A1* | 8/2002 | Kramskoy | G06F 8/4442 | 717/148 |
| 2004/0054994 A1* | 3/2004 | Demsey | G06F 9/45516 | 717/148 |
| 2004/0210865 A1* | 10/2004 | Shimura | G06F 8/41 | 717/100 |
| 2004/0230959 A1* | 11/2004 | Vick, Jr. | G06F 8/43 | 717/140 |
| 2004/0261065 A1* | 12/2004 | Abrams | G06F 8/47 | 717/140 |
| 2005/0060692 A1* | 3/2005 | Mansourov | G06F 8/425 | 717/141 |
| 2006/0048114 A1* | 3/2006 | Schmidt | G06F 9/45516 | 717/148 |
| 2006/0080341 A1* | 4/2006 | Graham | G06F 8/36 | |
| 2006/0089942 A1* | 4/2006 | Sutter | G06F 8/425 | |
| 2006/0212850 A1* | 9/2006 | Potts | G06F 8/423 | 717/126 |
| 2006/0277531 A1* | 12/2006 | Horwitz | G06F 8/75 | 717/137 |
| 2007/0061794 A1* | 3/2007 | Mausolf | G06F 9/44505 | 717/162 |
| 2007/0094648 A1* | 4/2007 | Post | G06F 9/45504 | 717/140 |
| 2007/0245323 A1* | 10/2007 | Bertelrud | G06F 8/41 | 717/140 |
| 2008/0127139 A1* | 5/2008 | Skaistis | G06F 8/427 | 717/143 |
| 2008/0141225 A1* | 6/2008 | Bostick | G06F 9/445 | 717/128 |
| 2010/0088686 A1* | 4/2010 | Langworthy | G06F 8/41 | 717/143 |
| 2010/0325620 A1* | 12/2010 | Rohde | G06F 9/44589 | 717/154 |
| 2012/0254835 A1* | 10/2012 | Muddu | G06F 8/36 | 717/121 |
| 2012/0272223 A1* | 10/2012 | Persson | G06F 9/45516 | 717/140 |
| 2012/0304166 A1* | 11/2012 | Gu | G06F 9/4401 | 717/174 |
| 2013/0212567 A1* | 8/2013 | Fisher | G06F 8/41 | 717/140 |
| 2015/0324183 A1* | 11/2015 | Fisher | G06F 8/41 | 717/176 |
| 2015/0347163 A1* | 12/2015 | Tibble | G06F 8/54 | 717/152 |

OTHER PUBLICATIONS

Eisenbach et al., Keeping Control of Reusable Components, publihsed by Springer-Verlag Berlin Heidelberg, 2004, p. 144-158.*
Compiler Cache, Retrieved online from Wayback Machine [https://web.archive.org/web/20130925073605/http://www.erikyyy.de/compilercache] on Sep. 12, 2016. publised before Sep. 25, 2013, p. 1-11.*
'https://ccache.samba.org' [online]. "ccache —a fast C/C++ compiler cache," retrieved from the internet on Feb. 26, 2016, retrieved from URL: https://ccache.samba.org/, 3 pages.

* cited by examiner

COMPILATION CACHE WITH IMPORTS SCANNER

BACKGROUND

This specification relates to compiling source code.

A compiler is a computer program that converts source code files written in a programming language into an output having a target language. The target language is often machine-readable code that can be executed by a processor.

Compiling source code files is often a time-consuming process. In large build systems, time spent compiling source code often has a non-trivial impact on the throughput of the system.

A compilation cache can improve compile times by maintaining information about compilation targets that have already been compiled. If the compilation cache indicates that a particular compilation target has already been generated, a build system need not recompile the files used to generate the compilation target.

However, even sophisticated build systems and compilers suffer from significant inefficiencies when compiling source code with a compilation cache. For example, parsing source code files at all is generally done with at least a sophisticated preprocessor, which is usually a computationally expensive operation. Furthermore, compilation caches rely on build utilities to determine which files are needed for a compilation target, but build systems generally do not analyze which files are actually required and not required to build compilation targets. Thus, many build systems recompile files needlessly over and over again.

SUMMARY

This specification describes how a build system can use an imports scanner to maintain a compilation cache. The system can use an imports scanner to quickly generate a reduced set of source code files that are actually required to be compiled for a particular compilation target.

Particular embodiments of the subject matter described in this specification can be implemented so as to realize one or more of the following advantages. Using an imports scanner with a compilation cache results in dramatically reduced build times in large build systems. In very large systems, this can reduce build times by an amount in the range of one to three orders of magnitude. In addition, using an imports scanner makes the compilation process more accurate by reducing the number files that are needlessly compiled and recompiled for particular compilation targets. That, in turn, allows programmers to work with a large library of optionally imported files, without suffering full recompiles of all entry points any time any file in the library is modified. Furthermore, the system need not maintain metadata files about which files have and have not been compiled.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
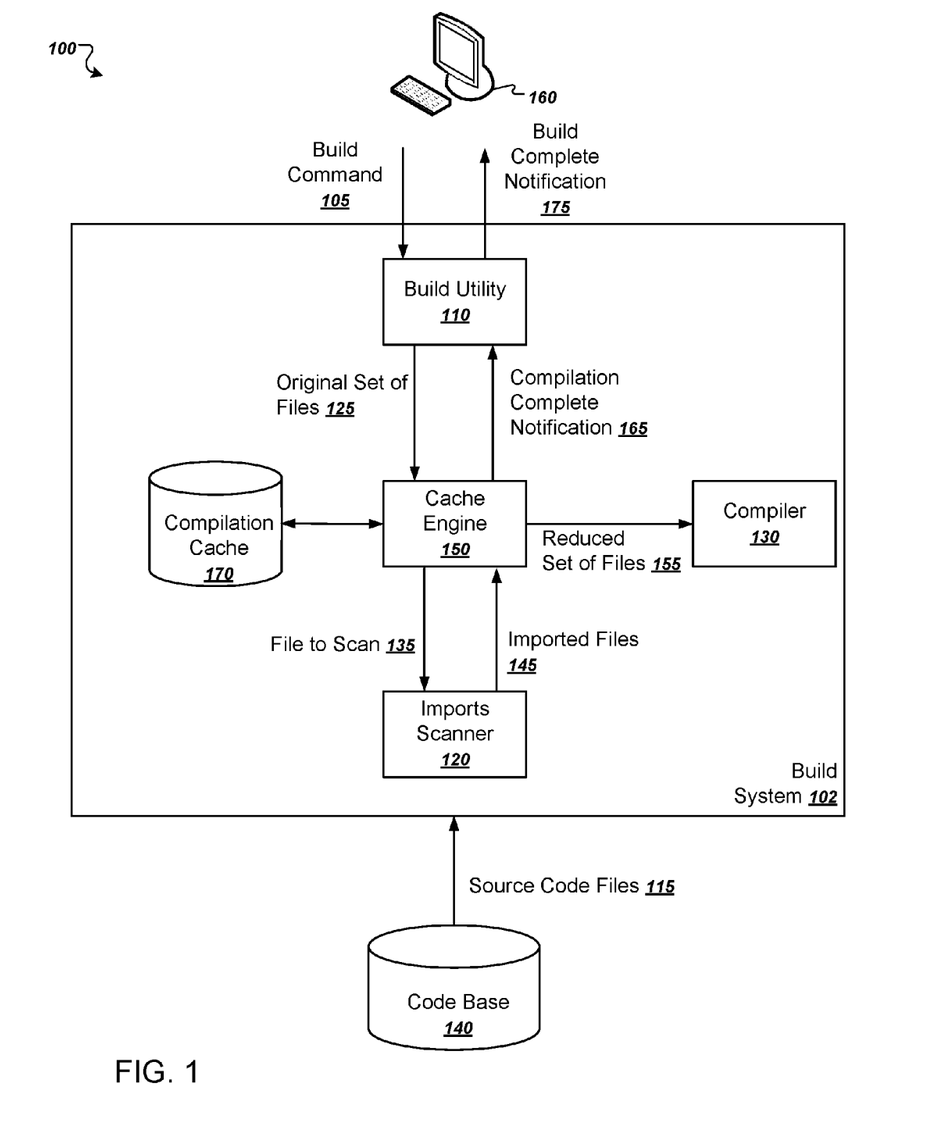
FIG. 1 is a diagram of an example system.

FIG. 1 is a diagram of an example system 100. The system 100 is an example of a system that uses an imports scanner 120 to support a compilation cache 170.

The system 100 includes a user device 160 in communication with a build system 102 over a network, which can be any appropriate communications network, e.g., a local area network or the Internet.

The build system 102 builds target executables using source code files 125 stored in a code base 140. The build system includes a build utility 110, a compiler 130, a cache engine 150, and an imports scanner 120. The components of the build system 102 can be implemented as computer programs installed on one or more computers in one or more locations that are coupled to each through a network. Alternatively, the build system 102 can be installed in whole or in part on a single computing device, e.g., the user device 160.

In operation, the user device 160 provides a build command 105 to the build system 102. The build command 105 can specify one or more target executables to be built by the build system 102. The build command 105 is received by a build utility 110.

The build utility 110 can be any appropriate software utility for initiating builds of source code in a code base. For example, the build utility 110 can be a software utility that explicitly makes compiler calls, e.g., the "make" utility of Linux and Unix systems or an application of an integrated development environment.

The build utility 110 can also be a software application whose use implicitly initiates builds by the build system 102. For example, the build utility 110 can be part of the front end of a database query engine. In that case, the build command 105 can be part of or result from a query received from the user device 160. The database query engine then implicitly compiles source code into a target executable to process the query. In other words, a user of the database front end need not explicitly specify target executables or target source code files. Rather, a query received from the user implicitly specifies an executable to be built by the build system for processing the query.

For each of the target executables specified by the build command 105, either implicitly or explicitly, the build utility 110 generates an original set of files 125 that need to be compiled in order to build the target executable. The build system 102 could possibly use the original set of files 125 to build the target executable, but doing so would introduce inefficiencies that can be improved by using a cache engine 150 and an imports scanner 120.

The cache engine 150 maintains a compilation cache 170. The compilation cache 170 maintains an entry for each compilation target that has already been compiled. Each compilation target is a file to be generated by a compiler or linker of the build system 102. Common compilation targets include executable files, object files, and library files.

The compilation cache 170 is a data store that associates each compilation target with one or more files that were used to generate the target. If for a given compilation target, the set of files associated with the target in compilation cache 170 have not changed, the system will not recompile the compilation target. Instead, the system consult the entry in the compilation cache 170 to locate and reuse the previously compiled target.

The cache engine 150 can improve compilation performance of the build system 102 by using an imports scanner 120. The imports scanner 120 a specially designed functional module whose purpose is to identify, as quickly as possible, files that are imported by a source code file. The imports scanner 120 can be designed to scan as little of a source code file as possible in order to identify all source code files imported by that file. Thus, for a given file to scan 135, the imports scanner 120 returns one or more imported files 145 that are imported by the file to scan 135.

The imports scanner 120 can identify the imported files without performing any sophisticated preprocessor operations or generating a preprocessed output file. For example, the imports scanner 120 can identify the imported files without actually importing the text of the imported files, without processing conditional compilation statements, without performing macro expansions or other macro directives, without performing user-defined compilation errors, and without performing other common operations that are performed by a preprocessor.

The cache engine 150 uses the imported files 145 reported by the imports scanner 120 to generate a reduced set of files 155. The reduced set of files 155 typically includes the same or fewer files than the original set of files 125 generated by the build utility 110. The reduced set of files 155 often excludes extraneous source code or library files that are not actually needed for the compilation target. Computing the reduced set of flies 155 is described in more detail below with reference to FIGS. 2-3.

The cache engine 150 then provides the reduced set of files 155, either individually or collectively, to a compiler 130. The compiler 130 then generates the appropriate compilation targets.

The cache engine 150 and the imports scanner 120 can individually or collectively be implemented as a wrapper around the compiler 130. In other words, instead of the build utility 110 providing the original set of files 125 to the compiler 130 directly, the system has the original set of files 125 intercepted by the cache engine 150. The cache engine 150 and the imports scanner 120 then processes the original set of files 125 to generate the reduced set of files 155 that are actually compiled by the compiler 130.

After compilation is complete, the cache engine 150 provides a compilation complete notification 165 back to the build utility 110. The build utility 110 can then generate another original set of files to be built or, if the build process is complete, can provide a build complete notification 175 back to the user device 160.

Figure 2:
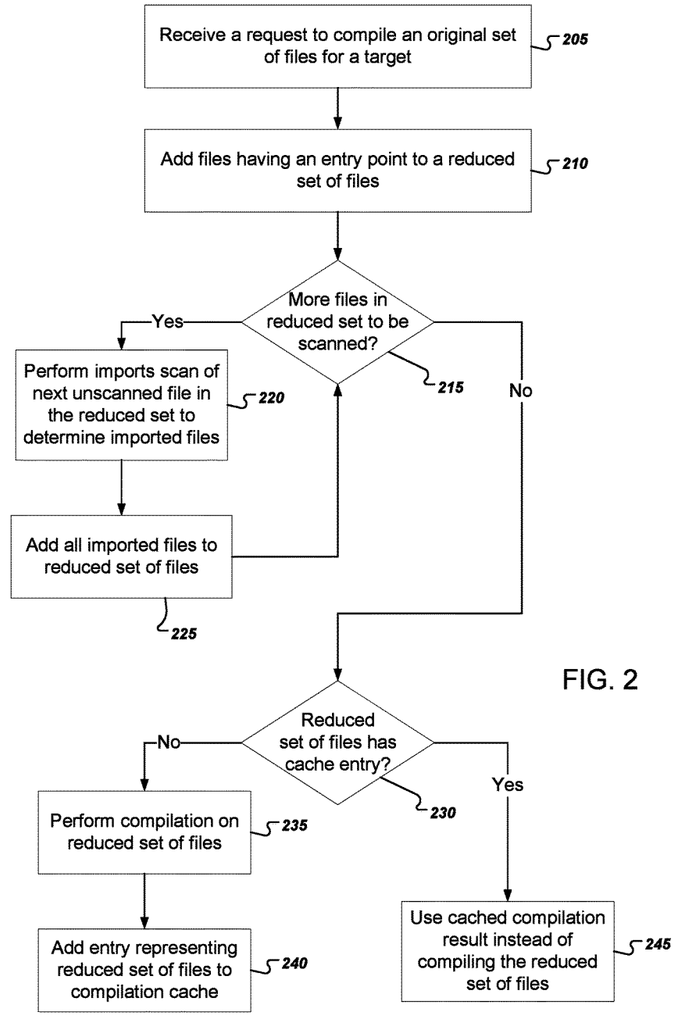
FIG. 2 is a flow chart of an example process for using an imports scanner for compilation caching.

FIG. 2 is a flow chart of an example process for using an imports scanner for compilation caching. In general, a system uses an imports scanner to generate a reduced set of source code files that omit extraneous source code or library files that are not needed for compilation. The process can be implemented by an appropriately programmed system of one or more computers, e.g., the build system 102 of FIG. 1.

The system receives a request to compile an original set of files (205). Most build systems provide build utilities that allow developers to specify source code files used to build a particular executable file.

For example, the "make" utility on Linux and Unix systems allows users to specify a target, e.g., an executable file, to be built and a set of intermediate targets, e.g., one or more object files, that must also be built to generate the target. The intermediate targets will also specify one or more source code files that need to be built to generate the intermediate target. Thus, the "make" utility can identify, for a particular executable file to be built, an original set of source code files to be compiled in order to generate the executable file.

The request to compile the original set of files can also be generated implicitly by the system. For example, the system can receive, at a database front end, a user query. The system can then determine a set of source code files that are required to be compiled in order for the query to be processed.

From the original set of source code files, the system can begin generating a reduced set of source code files. The system will use an imports scanner to determine which files of the original set are actually required to compile the target. The reduced set of files often includes fewer files than the original set, although sometimes the reduced set of files is equivalent to the original set of files.

The system adds files having an entry point to a reduced set of files (210). At a minimum, the system will need to build the target with source code files that have an entry point. An entry point is a location in the source code where control can be transferred from the operating system to the target executable that is being built. In C and C++, for example, the entry points are functions that are named "main." Thus, for C and C++ files, any file having a function named "main" will be added to the reduced set of files. Java programs similarly can be started from a method named "main" defined within a particular class.

The system will then use an imports scanner on each file in the reduced set. For each file imported by a file in the reduced set is also added to the reduced set.

The system determines whether more files in the reduced set have yet to be scanned (215).

If so, the system performs an imports scan of the next unscanned file in the reduced set of files to determine imported files (branch to 220). In other words, the system performs a scan of a particular file to identify all the files that the particular file imports. Performing an imports scan is described in more detail below with reference to FIG. 3.

The system then adds the imported files determined from the imports scan to the reduced set of files (230) before again determining if there are more unscanned files in the reduced set.

After the system scans all files in the reduced set of files, the reduced set of files will include only the files that are actually required to build the target executable. The reduced set of files will thus represent an accurate set of files needed to accurately consult a compilation cache for the target executable.

If there are no more files to be scanned in the reduced set of files, the system determines whether the reduced set of files has an entry in a compilation cache (branch to 245). To do so, the system can use the set of files in the reduced set of files as a key into a compilation cache. In other words, the system can determine if the compilation cache has a key that represents only the files in the reduced set of files.

The system can compute the key to the compilation cache in any appropriate way. For example, the system can use the set membership of the reduced set of files as a key. In other words, the system can perform a set comparison to determine whether or not two sets are the same. The system can also compute a reduced representation of the set of files, e.g., using an appropriate hashing function. If the set of files does not have an entry in the cache, the system performs a compilation on the reduced set of files (branch to 235) to build the target executable.

The system will then add an entry representing the reduced set of files to the compilation cache (240). The system can also associate the entry with a location of the target executable built with the reduced set of files.

If the reduced set of files did have an entry in the cache (230), the system can use the entry to locate the previously compiled target executable instead of recompiling the reduced set of files (245).

Figure 3:
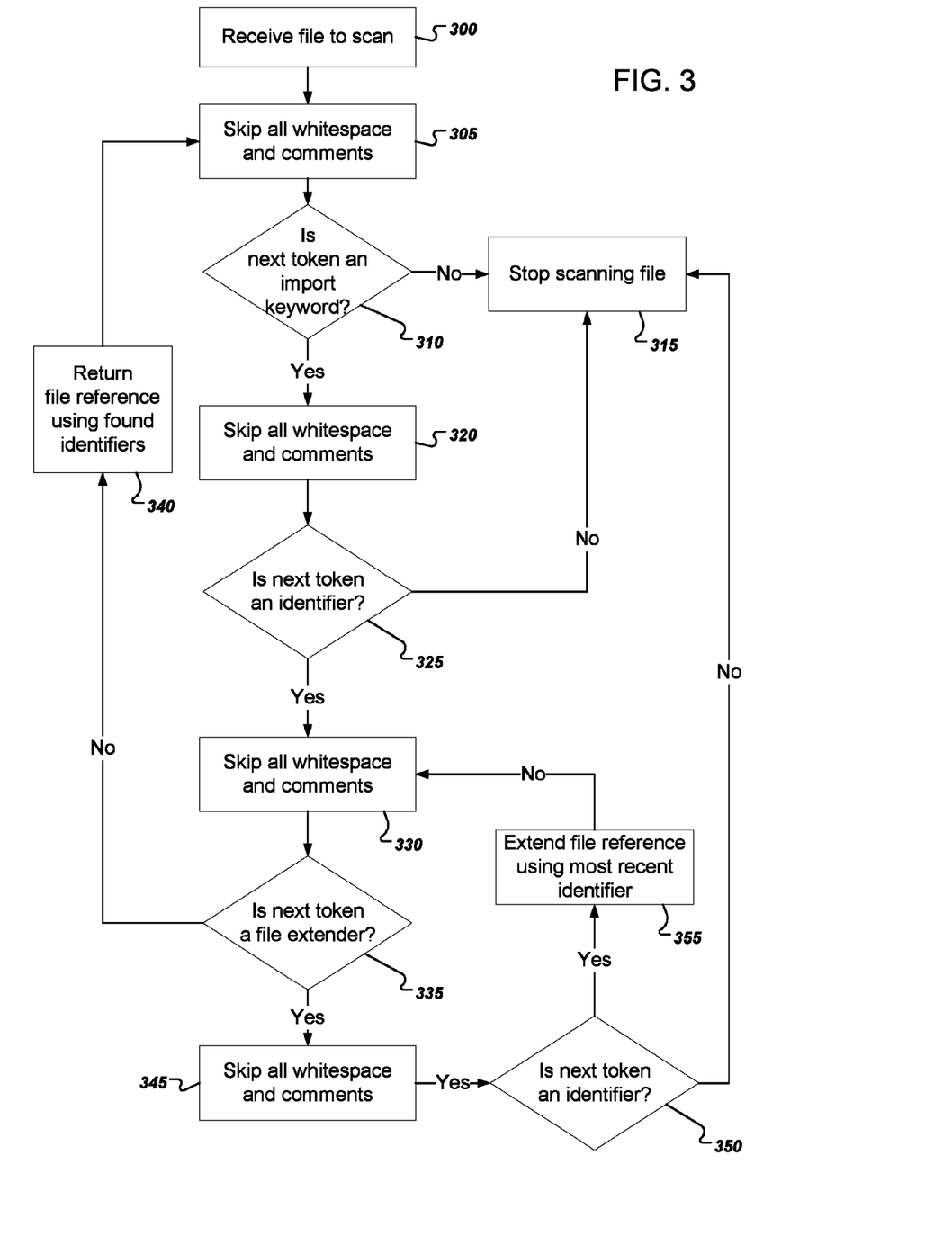
FIG. 3 is a flow chart of an example process for performing an imports scan for a source code file.

FIG. 3 is a flow chart of an example process for performing an imports scan for a source code file. The system can implement an imports scanner that scans a file to determine which other files are imported by that file. The process can be implemented by an appropriately programmed system of one or more computers, e.g., the imports scanner 120 of FIG. 1.

In general the process in FIG. 3 assumes that the system sequentially scans information from a file, starting at the beginning. The system can repeatedly read any appropriate amount of information at a time, e.g., one character at a time, one line at a time, or one token at a time.

The process starts when the system receives a file to scan (300). For example, as described above with reference to FIG. 2, the system can identify a previously unscanned file that is in a reduced set of source code files. The system can then begin scanning the unscanned file from the beginning of the file.

The system skips all whitespace and comments (305). In other words, the system starts from the beginning of the file and keeps reading information from the file until it no longer encounters whitespace, e.g., spaces, tabs, newline characters, and no longer encounters lines that are commented out.

The system determines whether the next token is an import keyword (310). Whether a token is an import keyword is a language-specific determination. For example, in some languages the import keyword is the word "import". In C, the import keyword is "#include".

If not, the system immediately stops scanning the file (branch to 315). The system thus continually seeks to end the scanning process as soon as possible and without scanning more information from the file than is necessary.

When the system stops scanning the file, the system can resume computing a set of reduced files for a particular target, e.g., step 215 of FIG. 2.

If the next token is an import keyword, the system skips all whitespace and comments (320) and determines whether the next token is an identifier (325).

Whether a token is an identifier is a language-specific determination. For example in C, an identifier is a string of characters that do not match a reserved keyword and which contain only underscores, capital letters, small letters, and digits, in which the first character is not a digit.

If the next token is not an identifier, the system stops scanning the file (branch to 315).

If the next token is an identifier, the system has potentially found all or part of a file reference that identifies a file to be imported. The file reference is information that can be used to locate the file in a file system. In some cases the file reference is a path to a directory location, e.g., "/usr/lib/examplelib.h."

The syntax used to specify file references differs from language to language, but in a typical scenario, a file reference is specified by one or more identifiers that are joined by file extender symbols. For example, in Java, the file extender is the dot character ".", and each identifier corresponds to a package name or a class name that can be used to locate a file to be imported. In many languages, the identifiers correspond closely to system directories and file names that can be used to determine a location for the file to be imported.

Thus, if the next token is an identifier, the system skips all whitespace and comments (330) and determines whether the next token is a file extender (335). In doing so, the system will try to determine all the identifiers of the file reference.

If the next token is not a file extender, the system has already identified all parts of the file reference. Thus, the system returns a file reference generated from the found identifiers (branch to 340).

After doing so, the system can continue to sequentially scan the file, e.g., by skipping all whitespace and comments (305) and determining whether the next token is an import keyword (310).

If the system did find a file extender (335), the system skips all whitespace and comments (345) and determines whether the next token is an identifier (350).

If so, the system extends the current file reference using the most recently found identifier (branch to 355). The system then continues scanning and skips all whitespace and comments (330) and determines whether the next token is a file extender (335).

If the next token after the file extender was not another identifier (350), the system stops scanning the file (branch to 315). This scenario is likely a syntax error in the import statement that would not result in a valid file being imported. Thus, the system can stop scanning the file at that point and report the error. Alternatively, the system can allow the compiler to run so that the compiler reports the error.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
  receiving an original set of source code files to be compiled for a compilation target;
  adding, to a reduced set of source code files, each file in in the original set having an entry point;
  repeatedly scanning each unscanned file in the reduced set of source code files until no unscanned files in the reduced set of source code remain, including:
    repeatedly identifying import statements in the unscanned file, and
    adding, to the reduced set of source code files, each file identified by an import statement in the unscanned file;
  determining whether the reduced set of files is represented by an entry in a compilation cache; and
  whenever the reduced set of files is not represented by an entry in the compilation cache, generating the compilation target using only the reduced set of source code files instead of the original set of source code files.

Embodiment 2 is the method of embodiment 1, wherein repeatedly scanning each unscanned file in the reduced set of source code files comprises stopping scanning the unscanned file as soon as a token that does not belong to an import statement is reached.

Embodiment 3 is the method of any one of embodiments 1-2, further comprising whenever the reduced set of files is represented by an entry in the compilation cache, reusing a previously generated compilation target identified by the entry instead of recompiling the compilation target.

Embodiment 4 is the method of any one of embodiments 1-3, wherein scanning an unscanned file in the reduced set of source code files comprises:
  skipping all whitespace and comments and determining whether the next token is an import keyword; and
  stopping scanning the file whenever the next token is not an import keyword.

Embodiment 5 is the method of any one of embodiments 1-4, wherein scanning the unscanned file in the reduced set of source code files comprises:
  after identifying an import keyword, skipping all whitespace and comments and determining whether the next token is an identifier; and
  stopping scanning the file whenever the next token is not an identifier.

Embodiment 6 is the method of any one of embodiments 1-5, wherein scanning the unscanned file in the reduced set of source code files comprises:
  after identifying an identifier, skipping all whitespace and comments and determining whether the next token is a file extender; and
  returning a file reference using all encountered identifiers in the import statement whenever the next token is not a file extender.

Embodiment 7 is the method of any one of embodiments 1-6, wherein scanning the unscanned filed in the reduced set of source code files comprises:
  after identifying a file extender, skipping all whitespace and comments and determining whether the next token is an identifier; and
  extending a file reference using a most recent identifier whenever the next token is an identifier.

Embodiment 8 is the method of any one of embodiments 1-7, further comprising:
  after extending the file reference, skipping all whitespace and comments and determining whether the next token is a file extender; and
  returning a file reference using all encountered identifiers in the import statement whenever the next token is not a file extender.

Embodiment 9 is the method of embodiment 7, further comprising:
  stopping scanning the file if the next token is not an identifier.

Embodiment 10 is the method of any one of embodiments 1-9, wherein scanning each unscanned file in the reduced set of source code files comprises scanning each file without performing any preprocessor operations on the file.

Embodiment 11 is a system comprising: one or more computers and one or more storage devices storing instructions that are operable, when executed by the one or more computers, to cause the one or more computers to perform the method of any one of embodiments 1 to 10.

Embodiment 12 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
  receiving an original set of source code files to be compiled for a compilation target;
  generating a reduced set of source code files from the original set of source code files, including adding, to the reduced set of source code files, each file in in the original set of source code files having an entry point, wherein the entry point is a location in source code where control can be transferred from an operating system to a target executable that uses the compilation target,
  whereby any files in the original set of source code files that do not include an entry point are not included in the reduced set of source code files;
  scanning each unscanned file in the reduced set of source code files until no unscanned files in the reduced set of source code files remain, including, for each unscanned file:
    repeatedly identifying import statements in the unscanned file, and
    adding, to the reduced set of source code files, each file identified by an import statement in the unscanned file;
  determining that the compilation target is represented by an entry in a compilation cache, wherein the entry in the compilation cache specifies a previous set of files used to compile the compilation target and a location of the previously compiled target;
  determining that the reduced set of files matches the previous set of files used to compile the compilation target and that none of the reduced set of files has changed since the entry for the compilation target was cached; and
  in response, reusing the previously compiled target instead of recompiling the compilation target, whereby if any of the original set of source code files that are not included in the reduced set of source code files have changed since the entry for the compilation target was cached, the compilation target is not recompiled.

2. The method of claim 1, wherein repeatedly scanning each unscanned file in the reduced set of source code files comprises stopping scanning the unscanned file as soon as a token that does not belong to an import statement is reached.

3. The method of claim 1, further comprising whenever the reduced set of source code files is represented by an entry in the compilation cache, reusing a previously generated compilation target identified by the entry instead of recompiling the compilation target.

4. The method of claim 1, wherein scanning an unscanned file in the reduced set of source code files comprises:
   skipping all whitespace and comments and determining whether the next token is an import keyword; and
   stopping scanning the file whenever the next token is not an import keyword.

5. The method of claim 4, wherein scanning the unscanned file in the reduced set of source code files comprises:
   after determining that the next token is an import keyword, skipping all whitespace and comments and determining whether the next token is an identifier; and
   stopping scanning the file whenever the next token is not an identifier.

6. The method of claim 5, wherein scanning the unscanned file in the reduced set of source code files comprises:
   after determining that the next token is an identifier, skipping all whitespace and comments and determining whether the next token is a file extender; and
   returning a file reference using all encountered identifiers in the import statement whenever the next token is not a file extender.

7. The method of claim 6, wherein scanning the unscanned filed in the reduced set of source code files comprises:
   after determining that the next token is a file extender, skipping all whitespace and comments and determining whether the next token is an identifier; and
   extending a file reference using a most recent identifier whenever the next token is an identifier.

8. The method of claim 7, further comprising:
   after extending the file reference, skipping all whitespace and comments and determining whether the next token is a file extender; and
   returning a file reference using all encountered identifiers in the import statement whenever the next token is not a file extender.

9. The method of claim 7, further comprising:
   stopping scanning the file if the next token is not an identifier.

10. The method of claim 1, wherein scanning each unscanned file in the reduced set of source code files comprises scanning each file without performing any preprocessor operations on the file.

11. A system comprising:
   one or more computers and one or more storage devices storing instructions that are operable, when executed by the one or more computers, to cause the one or more computers to perform operations comprising:
   receiving an original set of source code files to be compiled for a compilation target;
   generating a reduced set of source code files from the original set of source code files, including adding, to the reduced set of source code files, each file in in the original set of source code files having an entry point, wherein the entry point is a location in source code where control can be transferred from an operating system to a target executable that uses the compilation target,
   whereby any files in the original set of source code files that do not include an entry point are not included in the reduced set of source code files;
   repeatedly scanning each unscanned file in the reduced set of source code files until no unscanned files in the reduced set of source code files remain, including, for each unscanned file:
      repeatedly identifying import statements in the unscanned file, and
      adding, to the reduced set of source code files, each file identified by an import statement in the unscanned file;
   determining that the complication target is represented by an entry in a compilation cache, wherein the entry in the compilation cache specifies a previous set of files used to compile the compilation target and a location of the previously compiled target;
   determining that the reduced set of files matches the previous set of files used to compile the compilation target and that none of the reduced set of files has changed since the entry for the compilation target was cached; and
   in response, reusing the previously compiled target instead of recompiling the compilation target,
   whereby if any of the original set of source code files that are not included in the reduced set of source code files have changed since the entry for the compilation target was cached, the compilation target is not recompiled.

12. The system of claim 11, wherein repeatedly scanning each unscanned file in the reduced set of source code files comprises stopping scanning the unscanned file as soon as a token that does not belong to an import statement is reached.

13. The system of claim 11, wherein the operations further comprise whenever the reduced set of source code files is represented by an entry in the compilation cache, reusing a previously generated compilation target identified by the entry instead of recompiling the compilation target.

14. The system of claim 11, wherein scanning an unscanned file in the reduced set of source code files comprises:
   skipping all whitespace and comments and determining whether the next token is an import keyword; and
   stopping scanning the file whenever the next token is not an import keyword.

15. The system of claim 14, wherein scanning the unscanned file in the reduced set of source code files comprises:
   after determining that the next token is an import keyword, skipping all whitespace and comments and determining whether the next token is an identifier; and
   stopping scanning the file whenever the next token is not an identifier.

16. The system of claim 15, wherein scanning the unscanned file in the reduced set of source code files comprises:
   after determining that the next token is an identifier, skipping all whitespace and comments and determining whether the next token is a file extender; and
   returning a file reference using all encountered identifiers in the import statement whenever the next token is not a file extender.

17. The system of claim 16, wherein scanning the unscanned filed in the reduced set of source code files comprises:
  after determining that the next token is a file extender, skipping all whitespace and comments and determining whether the next token is an identifier; and
  extending a file reference using a most recent identifier whenever the next token is an identifier.

18. The system of claim 17, wherein the operations further comprise:
  after extending the file reference, skipping all whitespace and comments and determining whether the next token is a file extender; and
  returning a file reference using all encountered identifiers in the import statement whenever the next token is not a file extender.

19. The system of claim 17, wherein the operations further comprise:
  stopping scanning the file if the next token is not an identifier.

20. The system of claim 11, wherein scanning each unscanned file in the reduced set of source code files comprises scanning each file without performing any preprocessor operations on the file.

21. A computer program product, encoded on one or more nontransitory computer storage media, comprising instructions that when executed by one or more computers cause the one or more computers to perform operations comprising:
  receiving an original set of source code files to be compiled for a compilation target;
  generating a reduced set of source code files from the original set of source code files, including adding, to the reduced set of source code files, each file in the original set of source code files having an entry point, wherein the entry point is a location in source code where control can be transferred from an operating system to a target executable that uses the compilation target,
  whereby any files in the original set of source code files that do not include an entry point are not included in the reduced set of source code files;
  repeatedly scanning each unscanned file in the reduced set of source code files until no unscanned files in the reduced set of source code files remain, including, for each unscanned file:
    repeatedly identifying import statements in the unscanned file, and
    adding, to the reduced set of source code files, each file identified by an import statement in the unscanned file;
  determining that the compilation target is represented by an entry in a compilation cache, wherein the entry in the compilation cache specifies a previous set of files used to compile the compilation target and a location of the previously compiled target
  determining that the reduced set of files matches the previous set of files used to compile the compilation target and that none of the reduced set of files has changed since the entry for the compilation target was cached; and
  in response, reusing the previously compiled target instead of recompiling the compilation target,
  whereby if any of the original set of source code files that are not included in the reduced set of source code files have changed since the entry for the compilation target was cached, the compilation target is not recompiled.

22. The computer program product of claim 21, wherein repeatedly scanning each unscanned file in the reduced set of source code files comprises stopping scanning the unscanned file as soon as a token that does not belong to an import statement is reached.

23. The computer program product of claim 21, wherein the operations further comprise whenever the reduced set of source code files is represented by an entry in the compilation cache, reusing a previously generated compilation target identified by the entry instead of recompiling the compilation target.

24. The computer program product of claim 21, wherein scanning an unscanned file in the reduced set of source code files comprises:
  skipping all whitespace and comments and determining whether the next token is an import keyword; and
  stopping scanning the file whenever the next token is not an import keyword.

25. The computer program product of claim 24, wherein scanning the unscanned file in the reduced set of source code files comprises:
  after determining that the next token is an import keyword, skipping all whitespace and comments and determining whether the next token is an identifier; and
  stopping scanning the file whenever the next token is not an identifier.

26. The computer program product of claim 25, wherein scanning the unscanned file in the reduced set of source code files comprises:
  after determining that the next token is an identifier, skipping all whitespace and comments and determining whether the next token is a file extender; and
  returning a file reference using all encountered identifiers in the import statement whenever the next token is not a file extender.

27. The computer program product of claim 26, wherein scanning the unscanned filed in the reduced set of source code files comprises:
  after determining that the next token is a file extender, skipping all whitespace and comments and determining whether the next token is an identifier; and
  extending a file reference using a most recent identifier whenever the next token is an identifier.

28. The computer program product of claim 27, wherein the operations further comprise:
  after extending the file reference, skipping all whitespace and comments and determining whether the next token is a file extender; and
  returning a file reference using all encountered identifiers in the import statement whenever the next token is not a file extender.

29. The computer program product of claim 27, wherein the operations further comprise:
  stopping scanning the file if the next token is not an identifier.

30. The computer program product of claim 21, wherein scanning each unscanned file in the reduced set of source code files comprises scanning each file without performing any preprocessor operations on the file.

* * * * *

UNITED STATES PATENT AND TRADEMARK OFFICE
CERTIFICATE OF CORRECTION

PATENT NO. : 9,696,973 B1  
APPLICATION NO. : 15/052258  
DATED : July 4, 2017  
INVENTOR(S) : Alexander Spoon Page 1 of 1

It is certified that error appears in the above-identified patent and that said Letters Patent is hereby corrected as shown below:

On the Title Page

Column 2, item (57) in the Abstract, Line 5: Delete "in in" and insert -- in --, therefor.

In the Claims

Column 10, Line 38: In Claim 1, delete "in in" and insert -- in --, therefor.

Column 12, Line 1: In Claim 11, delete "in in" and insert -- in --, therefor.

Column 13, Line 35: In Claim 21, delete "in in" and insert -- in --, therefor.

Column 13, Line 57: In Claim 21, after "target" insert -- ; --.

Signed and Sealed this  
Twenty-third Day of April, 2019

Andrei Iancu  
*Director of the United States Patent and Trademark Office*